United States Patent [19]

Morikawa et al.

[11] Patent Number: 5,471,747
[45] Date of Patent: Dec. 5, 1995

[54] STEEL MATERIAL SHEARING MACHINE

[75] Inventors: Sumio Morikawa; Toshiji Ohga; Masahiro Kondoh, all of Osaka, Japan

[73] Assignee: Ohyodo Diesel Co., Ltd., Osaka, Japan

[21] Appl. No.: 101,358

[22] Filed: Aug. 3, 1993

[30] Foreign Application Priority Data

Jun. 16, 1993 [JP] Japan ................... 5-144448

[51] Int. Cl.⁶ ..................................... B25P 19/00
[52] U.S. Cl. ............... 30/134; 83/928; 144/34 E
[58] Field of Search .................. 30/134, 132, 135, 30/253, 254; 83/639.1, 928, 611; 144/34 E

[56] References Cited

U.S. PATENT DOCUMENTS

| | | |
|---|---|---|
| 3,523,365 | 8/1970 | Bengel et al. |
| 3,626,477 | 12/1971 | Fulghum, Jr. .................. 144/34 e |
| 4,519,135 | 5/1985 | LaBounty ...................... 30/134 |
| 4,616,417 | 10/1986 | Gross ........................... 30/134 |
| 4,771,540 | 9/1988 | LaBounty ...................... 30/134 |
| 5,146,683 | 9/1992 | Morikawa et al. ............... 30/134 |
| 5,179,985 | 1/1993 | Pallari ......................... 30/134 |
| 5,187,868 | 2/1993 | Hall. | |
| 5,224,268 | 7/1993 | Pemberton ..................... 30/134 |
| 5,291,657 | 3/1994 | Morikawa et al. ............... 30/134 |

FOREIGN PATENT DOCUMENTS 940442  3/1956  Germany.

Primary Examiner—Richard K. Seidel
Assistant Examiner—Allan M. Schrock
Attorney, Agent, or Firm—Morrison Law Firm

[57] ABSTRACT

Shearing blades are attached to a lower jaw and an upper jaw which are arranged to be opened and closed in a crossing manner. The lower leading blade 24 and the lower trailing blade 25, both attached to the lower jaw 4, are arranged to form a substantially V-shaped configuration and in a staggered fashion with respect to the shearing plane. The upper leading blade 30 and the upper trailing blade, both attached to the upper jaw 5, are arranged to form a substantially inverted V-shaped configuration and in a staggered fashion with respect to the shearing plane. At least one offset 26 and at least one gap 27 are provided between the lower leading blade 24 and the lower trailing blade 25, while at least one offset 32 and at least one gap 33 are provided between the upper leading blade 30 and the upper trailing blade 31.

2 Claims, 10 Drawing Sheets

STEEL MATERIAL SHEARING MACHINE

BACKGROUND OF THE INVENTION

1. Field of the Invention

This invention relates to a shearing machine mounted on a tip of an arm of a working machine, such as a power shovel, for shearing various kinds of steel material.

2. Statement of the Prior Art

When de-constructing or destroying reinforcing bars, buildings of a reinforced concrete construction, scrap steel articles or chemical machinery of steel alloy, a power shovel 1 shown in FIG. 11 is used. The power shovel includes an arm 2 mounted with a steel material shearing machine 3 at the tip end thereof. Such a conventional steel material shearing machine 3 includes a lower jaw 4 and an upper jaw 5. The upper jaw 5 is pivotably connected at the root portion thereof to the rearward portion of the lower jaw 4 by means of a support shaft 6. The upper jaw 5 and the lower jaw 4 are adapted to be opened and closed, in a scissors-like manner, relative to one another by means of a hydraulic cylinder disposed between a frame 7 extending from the lower jaw 4 and the upper jaw 5. The lower jaw 4 and the upper jaw 5 include their respective shearing blades 11, 12 attached to their respective inner surfaces adapted to be slidably engaged with each other. The lower shearing blade 11 attached to the lower jaw 4 and the upper shearing blade 12 attached to the upper jaw 5 are bent at their respective intermediate points 9 outwardly in the open-close direction of the jaws.

The steel material shearing machine 3 shears or cuts a steel material 13 clamped between the lower jaw 4 and the upper jaw 5 when the jaws are moved relative one another in a crossing manner. That is to say, the shearing blades 11, 12 attached to the lower and upper jaws, respectively, serve to shear the steel material 13 in both forward and rearward directions, while preventing slippage of the steel material 13 by reason of the outwardly displaced intermediate points 9.

With the steel material shearing machine 3 having the above construction, the rearward blade portion positioned rearwardly of the intermediate point 9 of each of the lower shearing blade 11 and the upper shearing blade 12 has an angle smaller than that of the forward blade portion. Thus, a cross-angle defined between the steel material and the lower and upper shearing blades 11, 12 becomes smaller as a shearing point of the steel material approaches the respective intermediate points 9, so that shearing ability is reduced at a position adjacent to the intermediate points 9.

It is also noted that the lower jaw 4 and the upper jaw 5 tend to move away from one another by reason of a force component of the shearing force perpendicular to the open-close direction of the lower and upper jaws 4, 5, thus causing so-called "mouth opening" phenomenon, to thereby reduce the shearing ability. The above phenomenon becomes remarkable as approaching the forward end of the blades.

In order to avoid the above "mouth opening" phenomenon, U.S. Pat. No. 4,519,135 discloses a construction in which a side plate is provided with the lower jaw for guiding of the outer side of the upper jaw, whereby the upper jaw is disposed between the lower jaw and the side plate, thus preventing the "mouth opening" phenomenon.

With the above construction, it should be noted, however, that the lower jaw becomes complicated, large in scale, and heavier. It should be noted further that a larger-scale hydraulic cylinder be required, since open-close stroke of the jaws becomes longer.

In order to solve the above problem, the applicant has proposed a steel material shearing machine 3 shown in FIGS. 12 and 13. The shearing machine 3 includes a plurality of lower shearing blades 14, 15 attached to the lower jaw 4. The forward, lower shearing blade (hereinafter referred to as "lower leading blade") 14 and rearward, lower shearing blade (hereinafter referred to as "lower trailing blade") 15 are angled with each other in a V-shaped configuration and staggered relative to one another with respect to the shearing plane as shown in the drawings. The upper jaw 5 also includes a plurality of upper shearing blades 16, 17 attached thereto. The forward, upper shearing blade (hereinafter referred to as "upper leading blade") 16 and the rearward, upper shearing blade (hereinafter referred to as "upper trailing blade") are angled with each other in an inverted V-shaped configuration and staggered relative to one another with respect to the shearing plane. The shearing machine 3 is swivelably mounted on a base frame 20 adapted to be attached to the arm. Thus, the shearing machine 3 is swivelable relative to the base frame 20 by means of an appropriate driving means (not shown).

With the above shearing machine 3, when the upper jaw 5 is closed by means of the hydraulic cylinder 10, the relationship between the interengagement of the upper leading blade 16 and the lower leading blade 14 and the interengagement of the upper trailing blade 17 and the lower trailing blade 15 becomes in opposed manner. Thus, mouth opening phenomenon between the upper leading blade 16 and the lower leading blade 14 can be prevented by reason of the interengagement between the upper trailing blade 17 and the lower trailing blade 15, while mouth opening phenomenon between the upper trailing blade 17 and the lower trailing blade 15 can be prevented by reason of the interengagement between the upper leading blade 16 and the lower leading blade 14. It is also noted that the longitudinally oppositely directed inclination of the blades prevents the steel material 13 from slipping in the longitudinal direction. The above construction permits high shearing ability.

SUMMARY OF THE INVENTION

Although the above shearing machine 3 has a high shearing ability, the lower leading blade 14 and the lower trailing blade 15 are leveled with each other at the intermediate point 9, and the upper leading blade 16 and the upper trailing blade 17 are also leveled with each other at the intermediate point 9. Thus, when such shearing machine is used to shear or cut a plate-like steel material having a width longer than the lower trailing blade 15, the width being long enough to extend across the intermediate point 9, a problem was experienced in that intermediate portion of such steel material could not be easily cut or sheared.

That is to say, a steel plate 13 of a significant width is sheared from opposite sides or ends thereof, at the same time, due to the interengagement of the lower leading blade 14 and the upper leading blade 16, and the interengagement of the lower trailing blade 15 and the upper trailing blade 17. In this connection, it is noted that, since the inclination of the lower trailing blade 15 and the upper trailing blade 17 is relatively gentle or loose, the shearing ability is reduced in an area adjacent to the intermediate point 9. Furthermore, the shearing action of the lower leading blade 14 and the upper leading blade 16 precedes as shown in FIG. 14, so that, when shearing action proceeds to an curved area adjacent to the intermediate point, as shown in FIGS. 16 and 17, the steel material 13 is clamped between the root portion or rearward portions of the lower leading blade 14 and the upper leading blade 16, and the forward end portions of the lower trailing blade 15 and the upper trailing blade 17. Thus, the upper and lower surfaces of the blades become substantially in flush with the upper and lower surfaces of the steel material adjacent to the intermediate point, respectively. By this, shearing force to be exerted to the steel material is not concentrated to the edge of the lower trailing blade 15 and the upper trailing blade 17 but is dispersed to the surface of the blades substantially in flush with the surfaces of the steel material. Accordingly, it is not possible for a hydraulic cylinder 10 of a normal power to proceed with further shearing action for completely cutting the steel material 13.

It is noted that, in FIGS. 14 through 17, the blades positioned in front of the shearing plane are shown by solid lines, while, the blades positioned backwardly of the shearing plane are shown by dotted lines.

It is, of course, possible to solve the above problem by employing a larger or more powerful hydraulic cylinder for moving the upper jaw 5 in order to obtain a higher shearing force. It is actually impossible, however, to employ such a powerful hydraulic cylinder in view of increased mounting space or weight thereof. If not impossible, such powerful hydraulic cylinder naturally increases the cost.

It is an object of the invention to provide a shearing machine of a relatively small size and having high shearing ability.

According to the invention, a steel material shearing machine is provided which comprises a lower jaw and an upper jaw adapted to be opened and closed in a crossing manner with each other, and a lower shearing blade and an upper shearing blade attached to the lower and upper jaws, respectively, each of the shearing blades being angled, at an intermediate point along the longitudinal direction of the blades, outwardly in the open-close direction of the jaws, wherein each of the blades are further angled, at least at a portion rearward of the intermediate point, outwardly in the open-close direction so as to form an offset at a position adjacent to the intermediate point.

The invention also provides a steel material shearing machine which comprises a lower jaw and an upper jaw adapted to be opened and closed in a crossing manner with each other, and a lower shearing blade and an upper shearing blade attached to the lower and upper jaws, respectively, each of the shearing blades being angled, at an intermediate point along the longitudinal direction of the blades, outwardly in the open-close direction of the jaws, each of the blades being arranged in a staggered fashion so that the forward portion forward of the intermediate point and the rearward portion rearward of the intermediate point of each of the blades are disposed in opposite sides of the shearing plane, wherein each of the blades are further angled, at least at a portion rearward of the intermediate point, outwardly in the open-close direction so as to form an offset at a position adjacent to the intermediate point.

In an alternative embodiment, one of the blades is formed with a gap at a position rearward of the intermediate point, while the other of the blades is formed with a gap at a position forward of the intermediate point.

In the above shearing machine, the lower trailing blade and the upper trailing blade form a steep angle due to their inclination, so that an increased cross-angle relative to the steel material can be obtained at least at a portion adjacent to the intermediate point. Furthermore, and with respect to shearing action adjacent to the intermediate point, shearing action of the leading blades precedes, and followed by the shearing action of the trailing blades, so that dispersion of a shearing force can be prevented, thus facilitating secure shearing of the steel material extending across the intermediate point.

BRIEF DESCRIPTION OF THE DRAWINGS

For better understanding of the invention, and to show how the same may be carried out into effect, reference will be now made, by way of example, to the accompanying drawings in which like reference numerals refer to like elements.

DETAILED DESCRIPTION OF THE PREFERRED EMBODIMENTS

Figure 1:
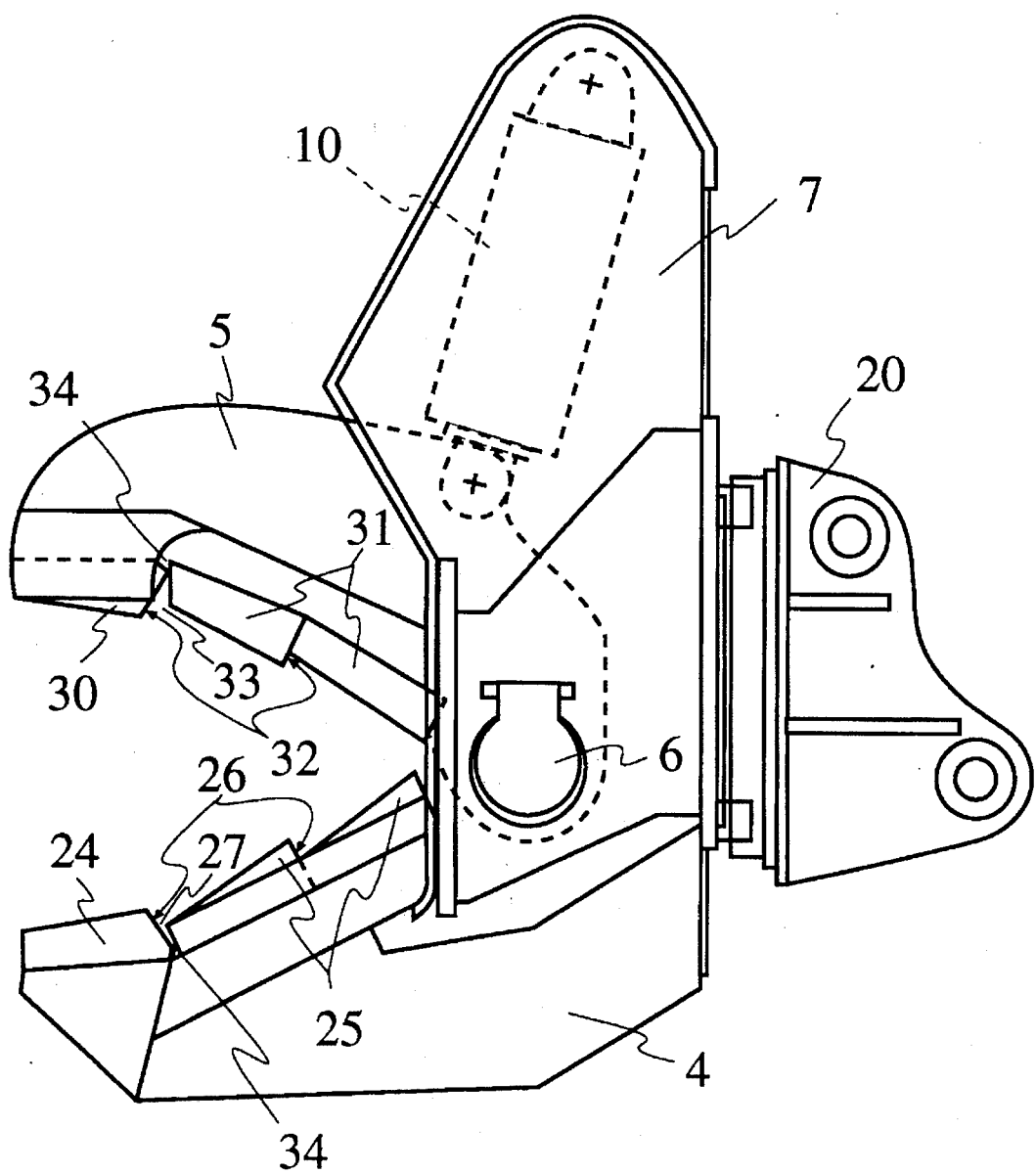
FIG. 1 is a side elevational view of a steel material shearing machine according to the invention with the jaws in an open position.
Figure 2:
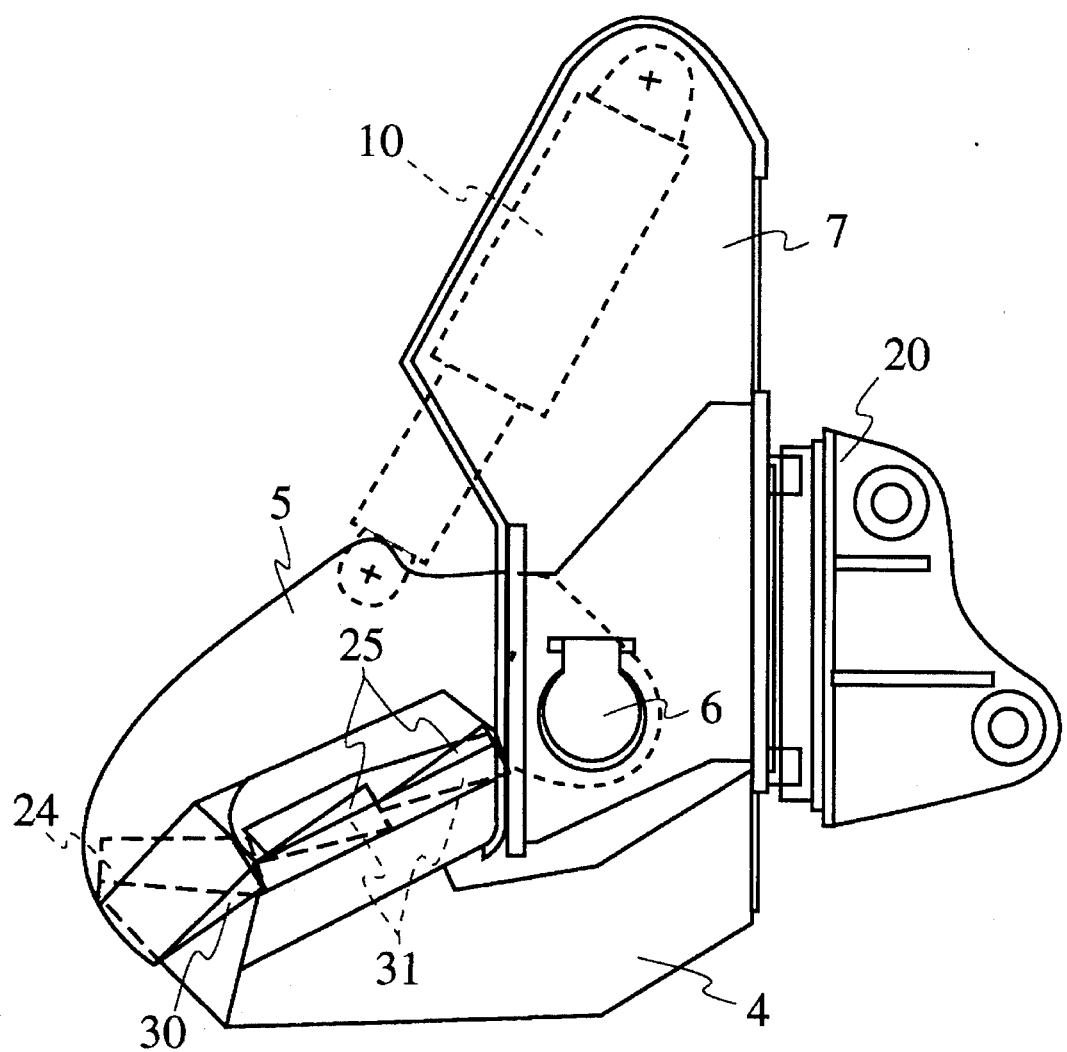
FIG. 2 is a side elevational view of the shearing machine with the jaws in a closed position.
Figure 3:
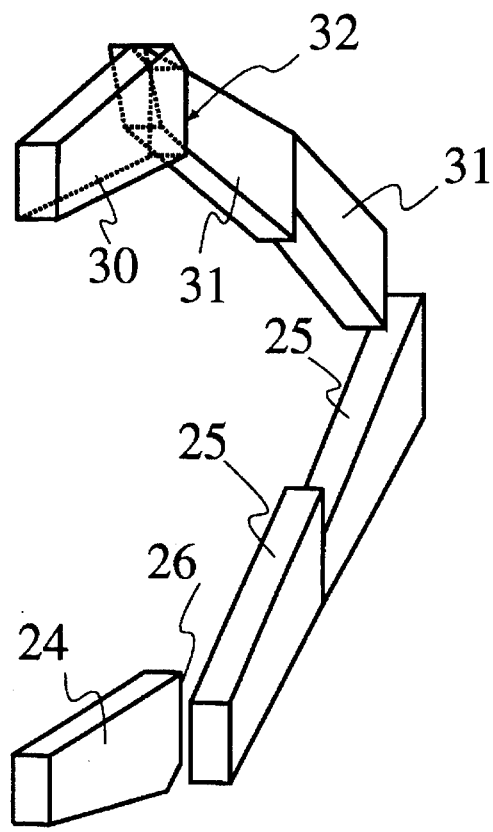
FIG. 3 is a perspective view illustrating spatial relationship between the shearing blades of the shearing machine.
Figure 4:
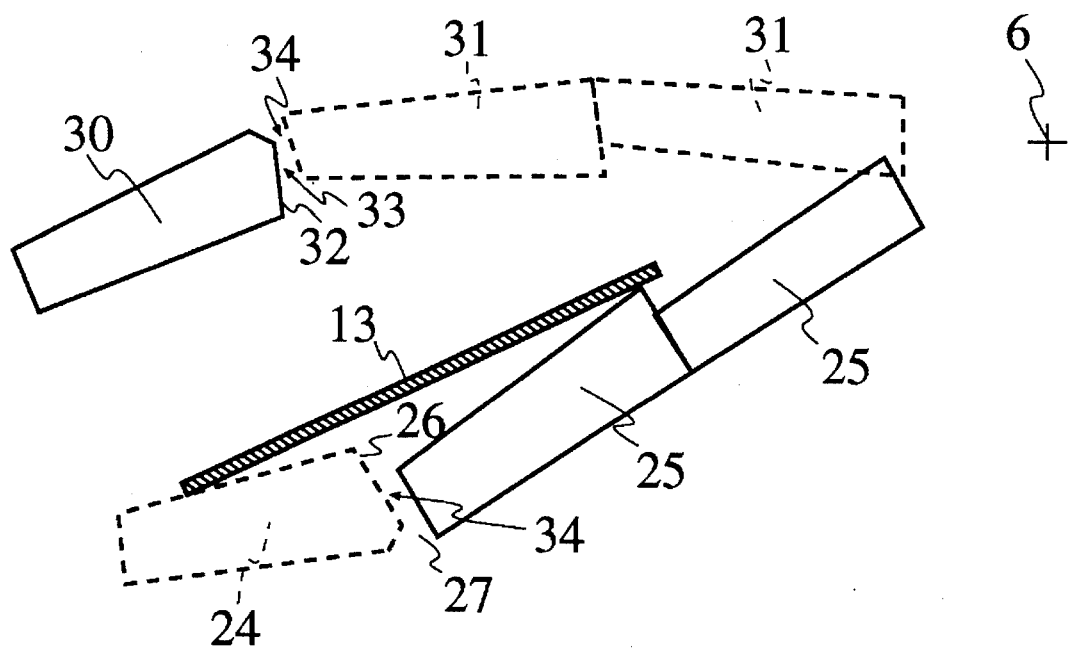
FIG. 4 is a diagrammatic illustrative view showing a first step of shearing mechanism of the shearing machine.

Several embodiments according to the invention will be explained below with reference to FIGS. 1 through 10. It is noted that like elements are designated by the same references in the prior art and omitted from explanation. It is also noted that, in FIGS. 4 through 8, the blades positioned in front of the shearing plane are shown by solid lines, while the blades positioned backward of the shearing plane are shown by dashed lines.

In accordance with the steel material shearing plate of the invention, a lower leading blade 24 and a lower trailing blade 25 attached to a lower jaw 4 are arranged in staggered fashion relative to one another with respect to the shearing plane. The forward end of the lower trailing blade 25 is angled or protruded closing direction so as to form an offset 26 in relation to the rearward end of the lower leading blade 24, thus forming a saw blade-like configuration. Similarly, an upper leading blade 30 and an upper trailing blade 31 attached to an upper jaw 5 are arranged in a staggered fashion relative to one another with respect to the shearing plane. The tip end or forward end of the upper trailing blade 31 protrudes in the closing direction so as to form an offset 32 in relation to the rearward end of the upper leading blade 30, thus forming a saw blade-like configuration. When the upper jaw 5 is closed, the lower leading blade 24 and the upper leading blade 30 are engaged with each other, while the lower trailing blade 25 and the upper trailing blade 31 are engaged with each other, so that they cooperate to shear or cut a steel material 13 while preventing mouth opening phenomenon. It is noted that the lower trailing blade 25 and the upper trailing blade 31 themselves are formed into a saw blade-like configuration.

The tip end or forward end of the upper trailing blade 31 is displaced rearwardly from the intermediate point 34 so as to form a gap 33 in relation to the rearward end of the upper leading blade 30. The rearward end 26 of the lower leading blade 24 is displaced forwardly from the intermediate point 34 so as to form a gap 27 in relation to the tip end or forward end of the lower trailing blade 25.

Figure 5:
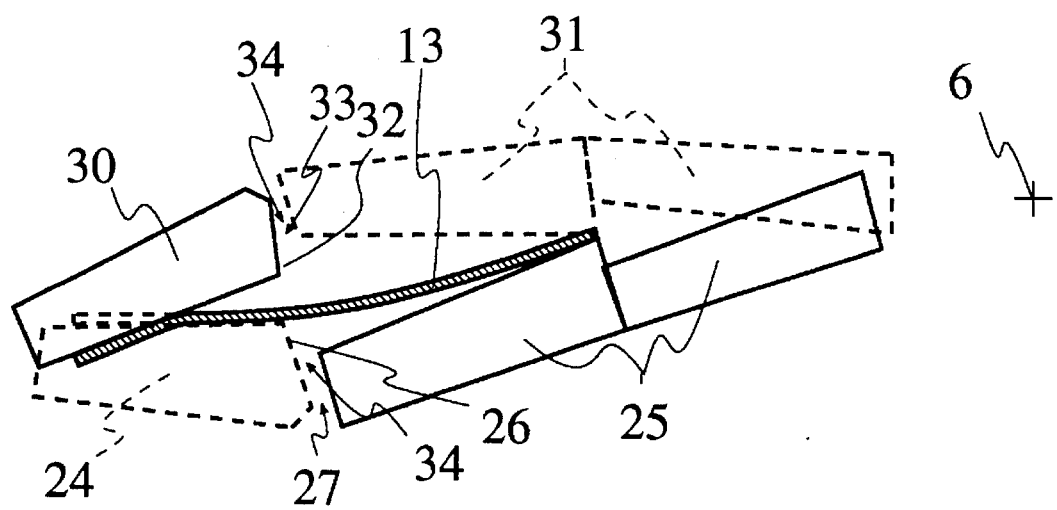
FIG. 5 is a diagrammatic illustrative view showing a second step of shearing mechanism of the shearing machine.
Figure 6:
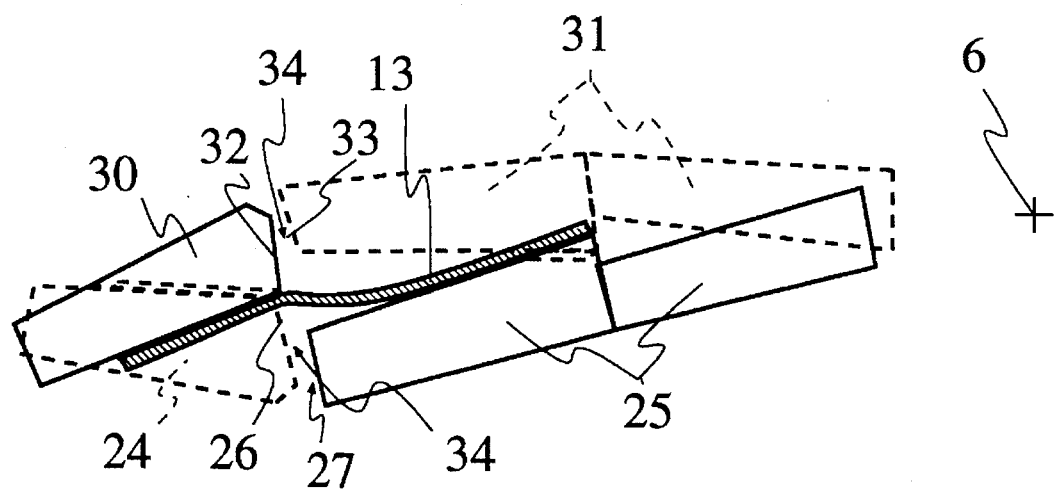
FIG. 6 is a diagrammatic illustrative view showing a third step of shearing mechanism of the shearing machine.

When the steel material shearing machine is used to shear a steel material having a width sufficient to extend across the curved intermediate point 34, shearing operation is initiated from opposite ends of the steel material at the same time, as shown in FIGS. 5 and 6, due to the interengagement between the lower leading blade 24 and the upper-leading blade 30, and the interengagement between the lower trailing blade 25 and the upper trailing blade 31. The shearing action between the lower leading blade 24 and the upper leading blade 30 proceeds.

When the shearing action proceeds, from the forward end of the steel material 13, to a point adjacent to the intermediate point 34, the shearing action between the lower leading blade 24 and the upper leading blade 30 is first completed at the intermediate point 34, since the rearward end of the lower leading blade 24 is higher than the forward end of the lower trailing blade 25, and the rearward end of the upper leading blade 30 is lower than the forward end of the upper trailing blade 31. Thus, the forward end of each of the lower trailing blade 25 and the upper trailing blade 31 is not contacted with the steel material 13, so that flush or parallel engagement between the upper and lower surfaces of the blades and the steel material 13 is prevented, whereby smooth shearing action can be proceeded.

Figure 7:
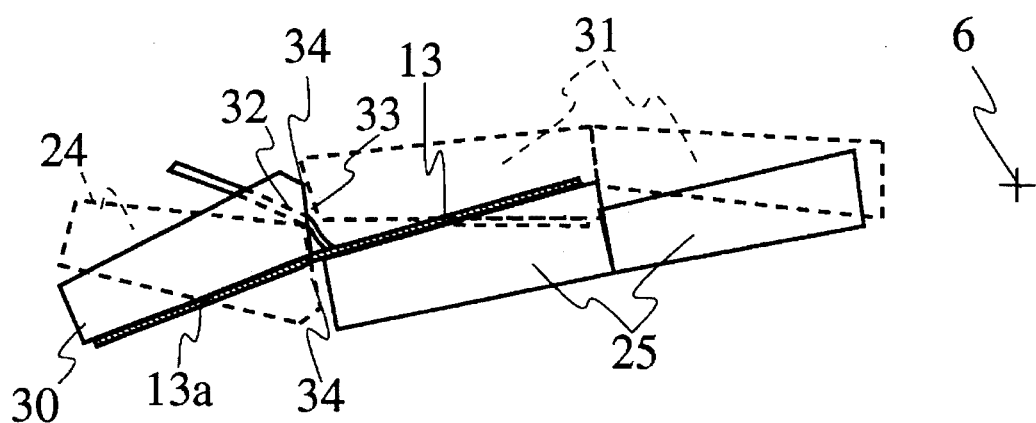
FIG. 7 is a diagrammatic illustrative view showing a fourth step of shearing mechanism of the shearing machine.
Figure 8:
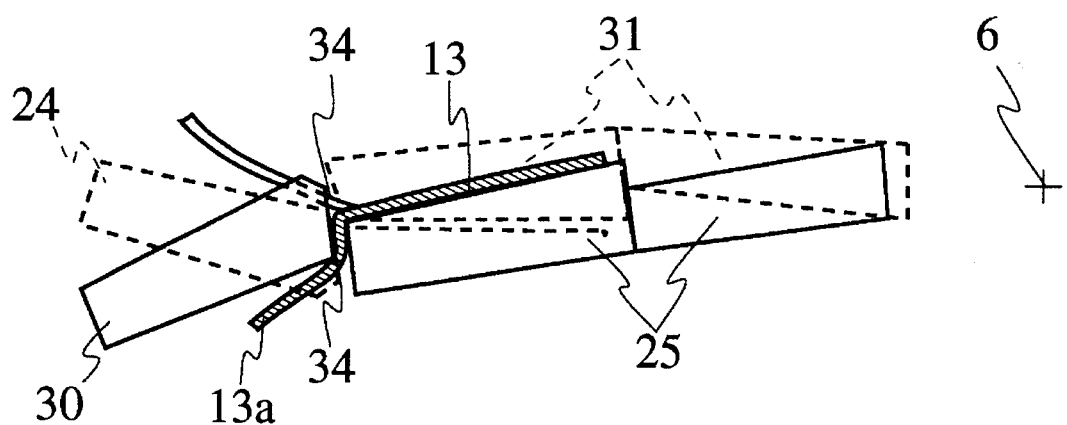
FIG. 8 is a diagrammatic illustrative view showing a fifth step of shearing mechanism of the shearing machine
Figure 9:
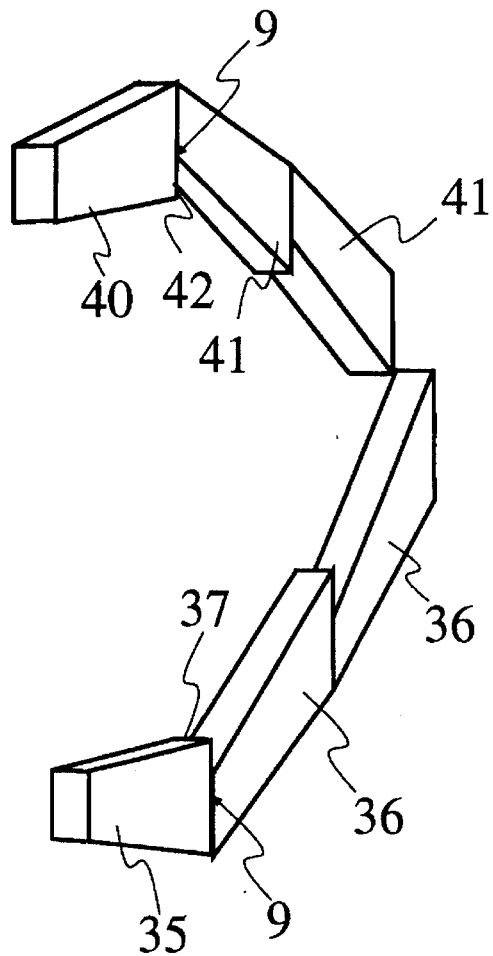
FIG. 9 is a perspective view illustrating spatial relationship between the blades of an alternative steel material shearing machine.
Figure 10:
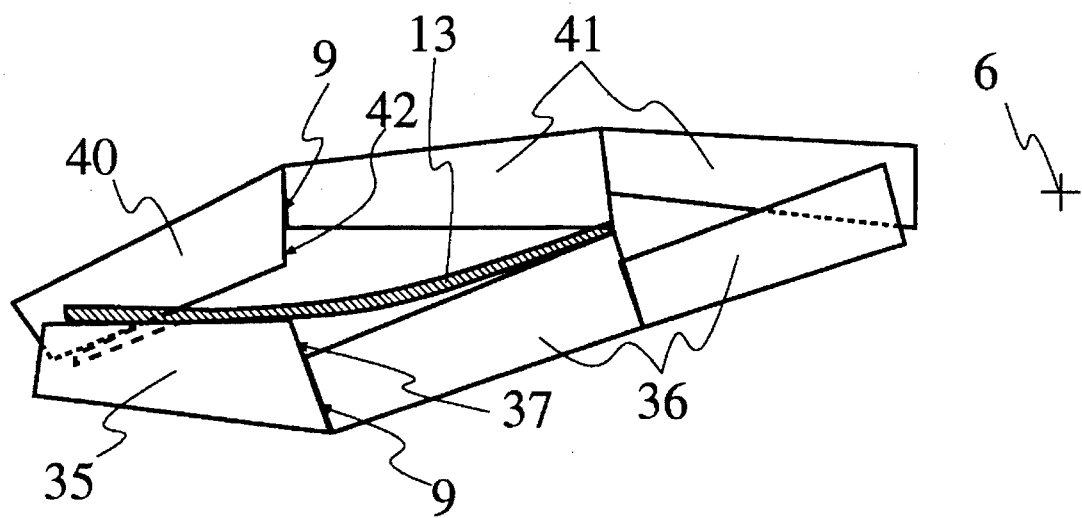
FIG. 10 is a diagrammatic illustrative view showing shearing mechanism of the shearing machine of FIG. 9.
Figure 11:
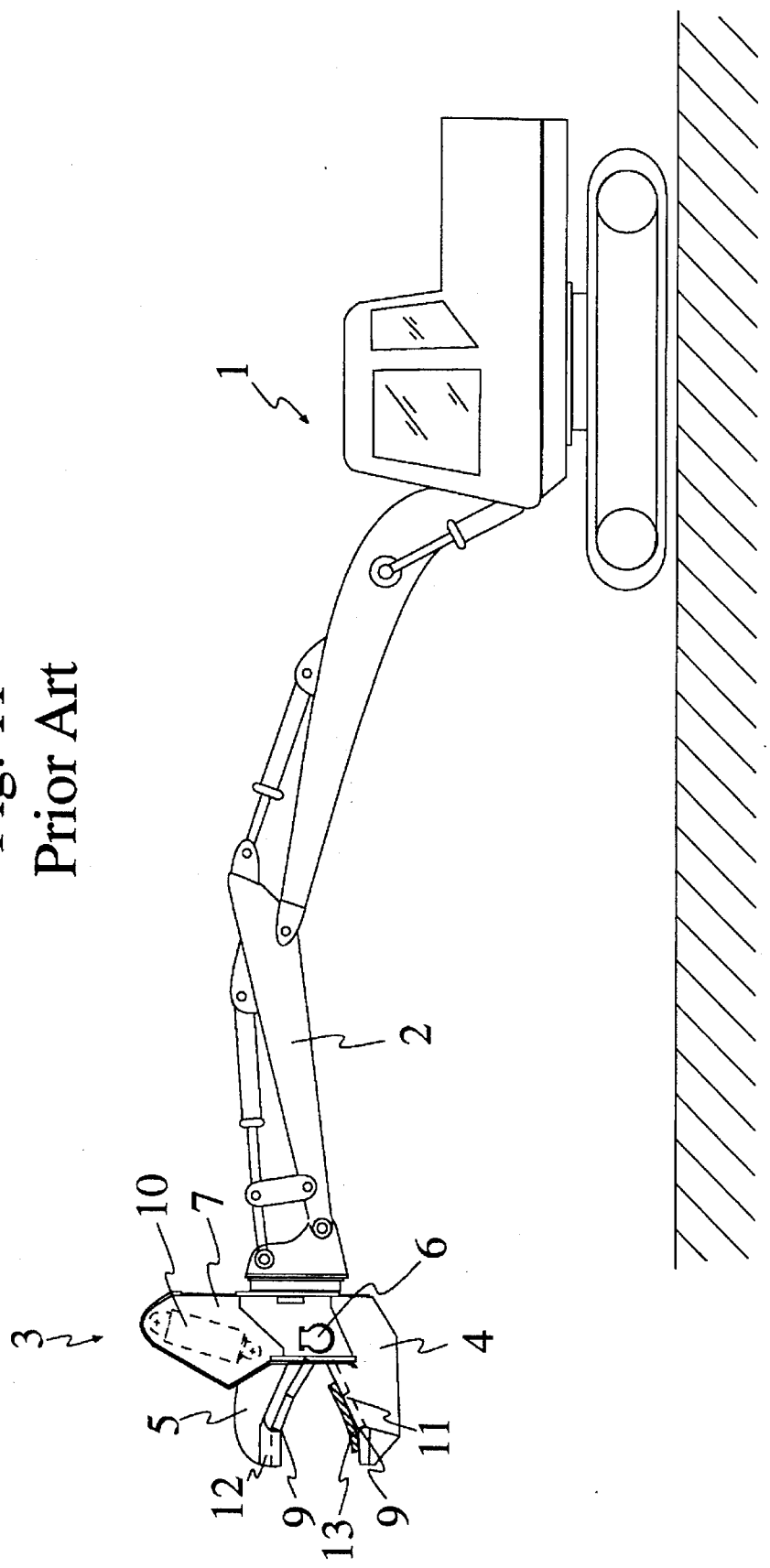
FIG. 11 is side elevational view of a power shovel mounted with a conventional steel material shearing machine.
Figure 12:
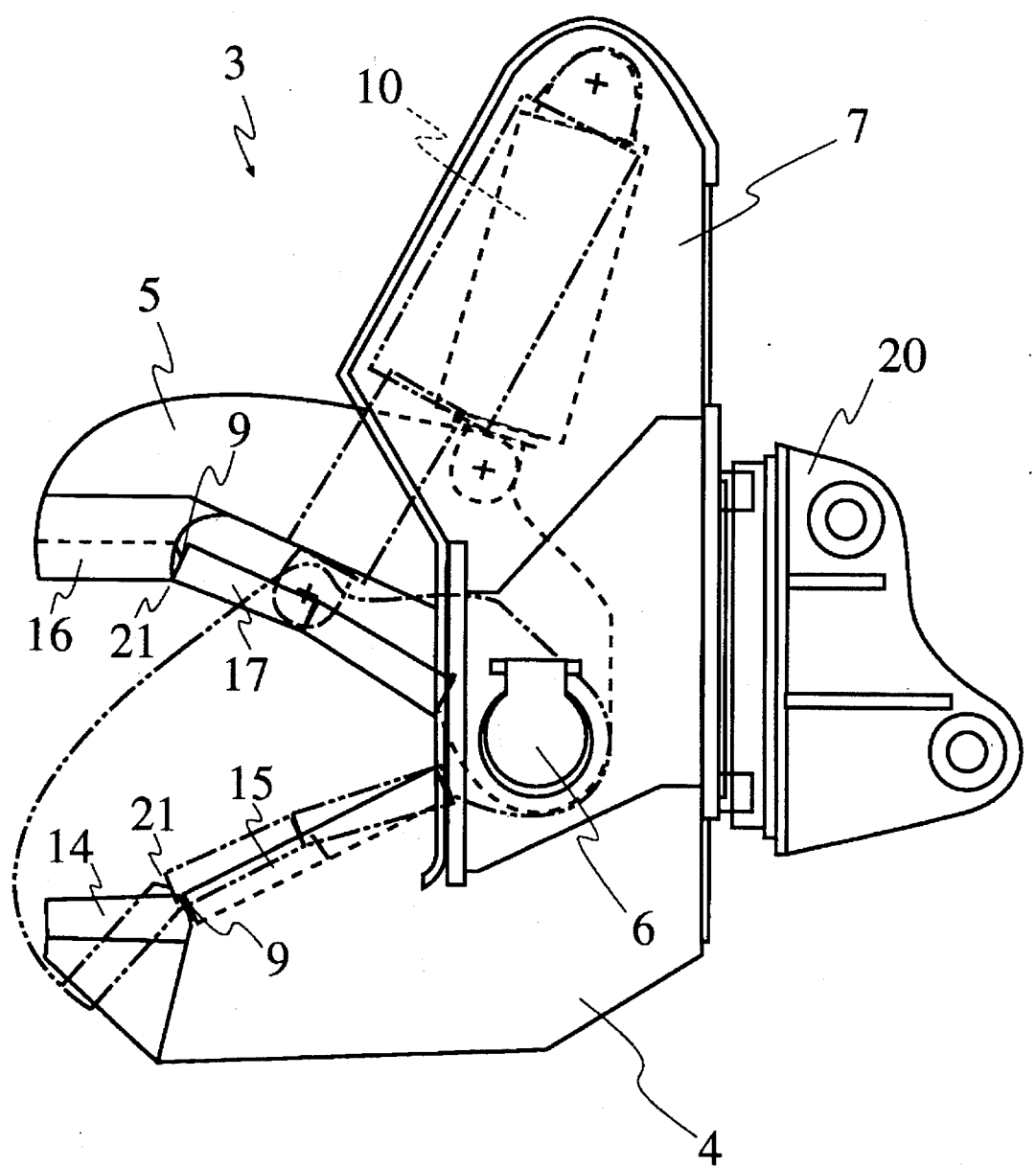
FIG. 12 is a side elevational view of the conventional shearing machine.
Figure 13:
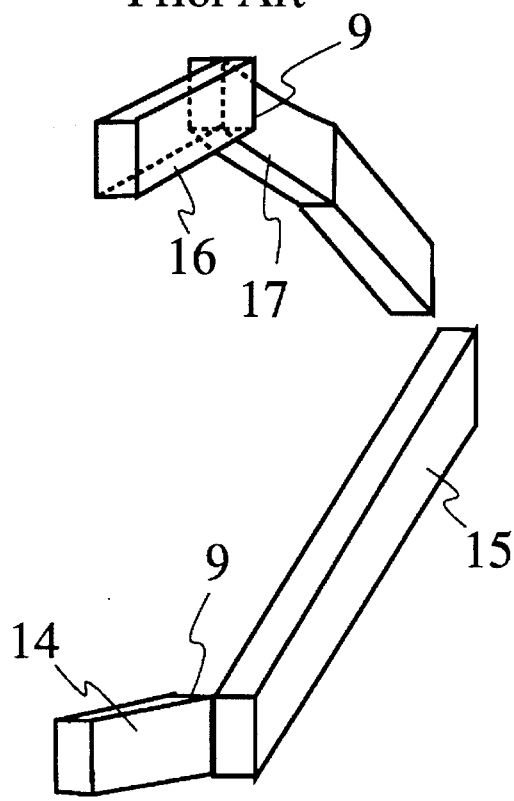
FIG. 13 is a perspective view illustrating spatial relationship between the blades of the conventional shearing machine.
Figure 14:
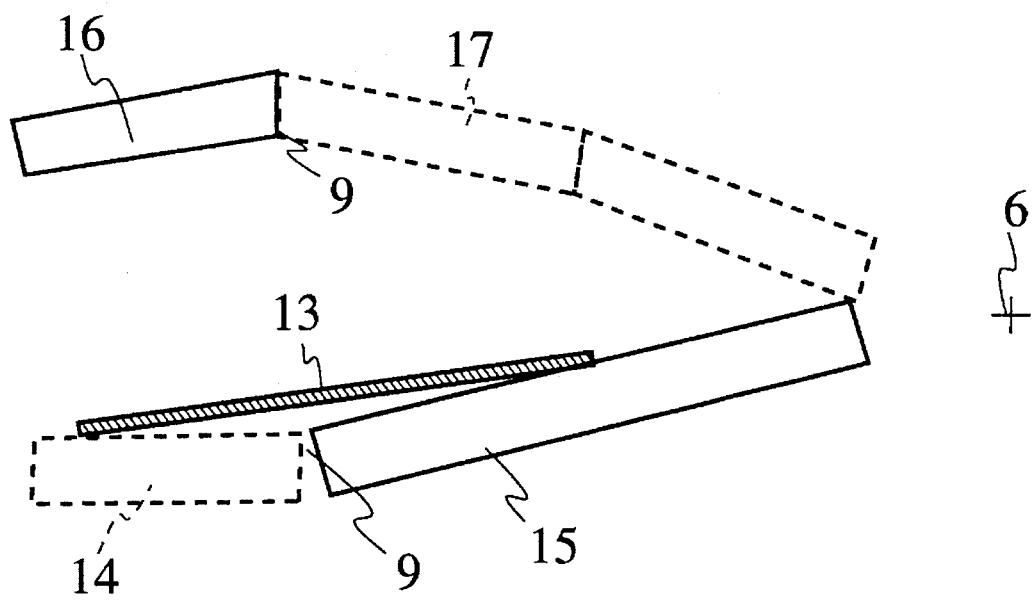
FIG. 14 is a diagrammatic illustrative view showing a first step of shearing mechanism of the conventional shearing machine.
Figure 15:
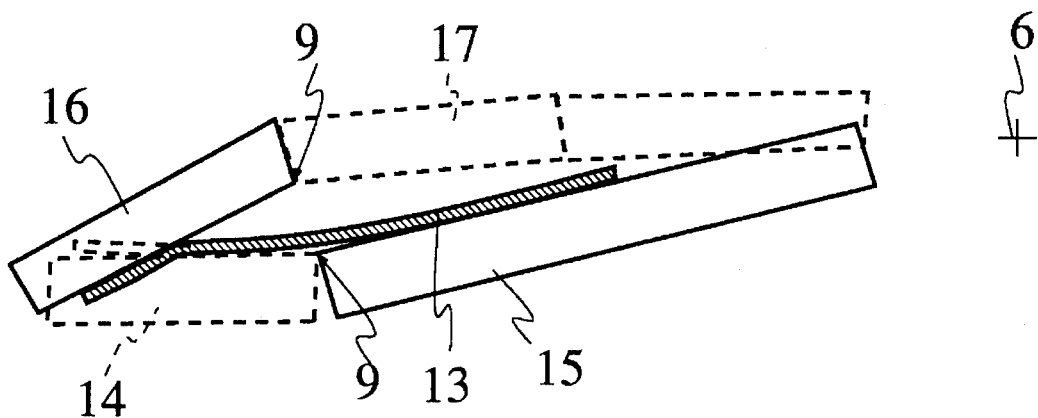
FIG. 15 is a diagrammatic illustrative view showing a second step of shearing mechanism of the conventional shearing machine.
Figure 16:
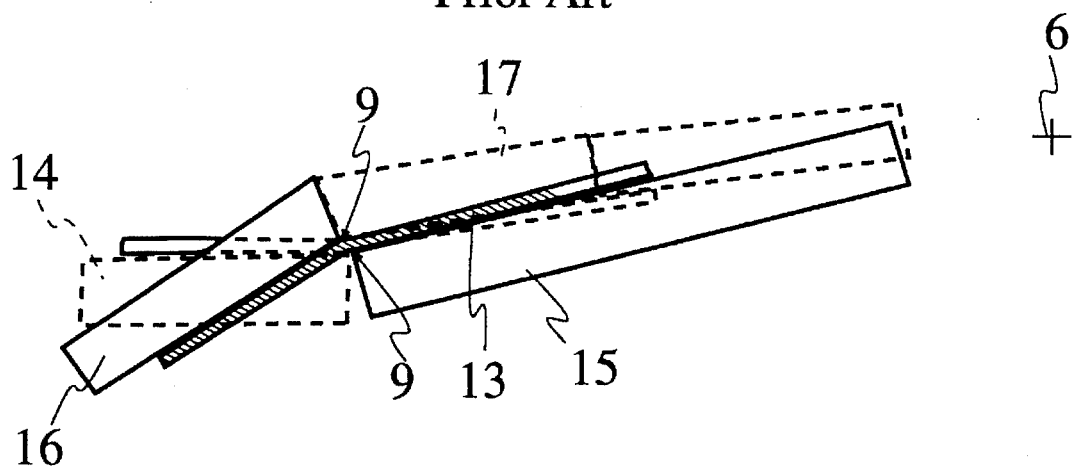
FIG. 16 is a diagrammatic illustrative view showing a third step of shearing mechanism of the conventional shearing machine.
Figure 17:
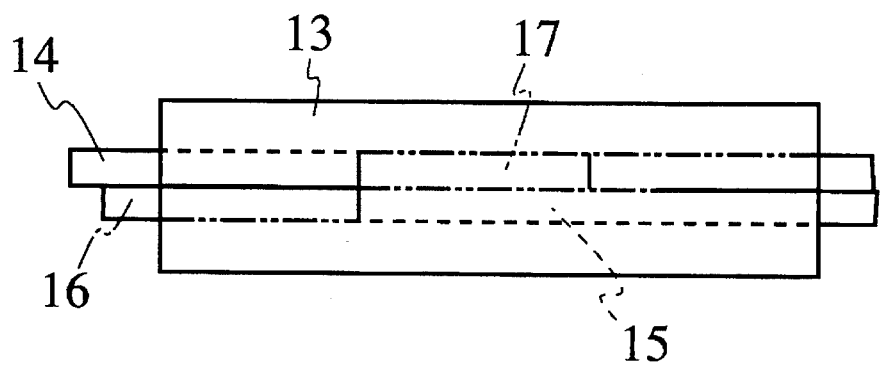
FIG. 17 is a plan view illustrating inconvenience experienced in the conventional shearing machine.

When the rearward end of the upper leading blade 30 and the forward end of the lower trailing blade 25 become in contact with the steel material 13 and is forced relative to one another, as shown in FIG. 7, the shearing action of the upper leading blade 30 has been completed. Furthermore, the forward end of the upper trailing blade 31 is not yet in contact with the steel material 13. Thus, the upper leading blade 30 is moved downwardly while displacing a cut piece 13a downwardly, as shown in FIG. 8, so that the shearing action between the lower trailing blade 25 and the upper trailing blade 31 proceeds. Consequently, the steel material is cut into two pieces. It is also noted that the lower trailing blade 25 and the upper trailing blade 31 have a steep angle, and thus have an increased intersection angle or cross angle relative to the steel material 13. Accordingly, shearing action may be securely proceeded to a final point.

Even in a steel material shearing machine having shearing blades which are not arranged in a staggered fashion, the forward end of a lower trailing blade 36, attached to the lower jaw (not shown) at a position rearwardly of the intermediate point 34, can be angled outwardly so as to form an offset 37 in relation to the rearward end of a lower leading blade 35. An upper trailing blade 41, attached to the upper jaw (not shown) at a position rearwardly of the intermediate point 34 is also angled outwardly so as to form an offset 42 in relation to the rearward end of the upper leading blade 40.

In the thus constructed steel material shearing machine, the lower trailing blade 36 and the upper trailing blade also have a steep angle. Furthermore, the cross angle or intersection angle relative to the steel material adjacent to the intermediate point 34 is increased. Accordingly, shearing ability will not be reduced until final point.

In accordance with the invention, it is possible to obtain a steeper inclined angle of the shearing blades positioned rearwardly of the intermediate point, when the shearing machine is used to cut or shear a steel material extending across the intermediate point. An increased cross angle relative to the steel material may be maintained at a position adjacent to the intermediate point. Thus, increased shearing ability may be obtained. It should be also noted that, at the intermediate point, the leading blades and the trailing blades serve to securely shear a steel material in a predetermined sequential manner, so that variance of a shearing force may be prevented. With the shearing machine provided with the gaps adjacent to the intermediate points, it is possible to prevent the shearing blades from contacting the steel material in a flush or parallel manner, thus enabling a relatively small hydraulic cylinder having a relatively small power to easily shear or cut a relatively thick steel material.

The principles, preferred embodiments and modes of operation of the invention have been described in the foregoing specification. It should be noted, however, that the invention is not limited by such illustrative embodiments. Variations and changes may be made by one having ordinary skilled in the art without departing from the spirit of the invention. Accordingly, the foregoing detailed description should be regarded as exemplary in nature and not limiting the scope and spirit of the invention set forth in the appended claims.

What is claimed is:

1. A steel material shearing machine comprising a lower jaw and an upper jaw adapted to be opened and closed in a crossing manner with each other, and a lower shearing blade and an upper shearing blade attached to said lower and upper jaws, respectively, each of said shearing blades having an intermediate point along a longitudinal direction of said blades, each of said blades being arranged in a staggered fashion so that a forward portion forward of said intermediate point and a rearward portion rearward of said intermediate point of each of said blades are disposed on opposite sides of a shearing plane between said lower and upper shearing blades, a portion of each of said blades rearward of said intermediate point are positioned further outwardly in a closing direction so as to form an offset at a position adjacent to said intermediate point.

2. A steel material shearing machine in accordance with claim 1, wherein one of said blades is formed with a gap at a position rearward of said intermediate point, while the other of said blades is formed with a gap at a position forward of said intermediate point.

* * * * *